United States Patent [19]

Lam et al.

[11] Patent Number: 5,166,439
[45] Date of Patent: Nov. 24, 1992

[54] COMPOSITION CONTAINING A MANNICH BASE OF A PARTIALLY SULFURIZED HINDERED PHENOL MIXTURE

[75] Inventors: William Y. Lam, Ballwin; Christian S. Harstick, Crestwood, both of Mo.

[73] Assignee: Ethyl Petroleum Additives, Inc., Richmond, Va.

[21] Appl. No.: 440,707

[22] Filed: Nov. 24, 1989

[51] Int. Cl.$^5$ .................. C07C 211/00; C10M 135/30
[52] U.S. Cl. .................. 564/384; 252/47.5; 564/366; 564/367; 564/372
[58] Field of Search .............. 252/48.2, 45, 405, 397, 252/406, 399, 404, 407, 401, 402, 47.5, 47; 568/23, 22, 25, 36, 75, 77; 564/366, 367, 372, 384

[56] References Cited

U.S. PATENT DOCUMENTS

| | | | |
|---|---|---|---|
| 3,741,896 | 6/1973 | Abbott et al. | 252/42.7 |
| 3,883,501 | 5/1975 | Malec | 252/48.2 X |
| 3,929,654 | 12/1975 | Brewster | 252/48.2 |
| 3,951,830 | 4/1976 | Karn | 252/48.2 X |
| 3,956,148 | 5/1976 | Swietlik et al. | 252/47.5 |
| 3,992,308 | 11/1976 | Malec | 252/48.2 |
| 4,157,309 | 6/1979 | Wilgus et al. | 252/47.5 |
| 4,175,044 | 11/1979 | Wilgus et al. | 252/47.5 |
| 4,178,259 | 12/1979 | King | 252/47.5 |
| 4,946,610 | 8/1990 | Lam et al. | 252/48.4 |
| 5,009,802 | 4/1991 | Lam et al. | 252/48.2 |

OTHER PUBLICATIONS

Alpha Olefins Applications Handbook, pp. 346, 347 Marcel Dekker, Inc. 1989.

Primary Examiner—Jerry Johnson
Attorney, Agent, or Firm—David M. Bunnell

[57] ABSTRACT

A sulfurized, phenolic antioxidant having a low chlorine content and good copper corrosion properties is prepared by reacting a partially sulfurized mixture of reactive, hindered phenols with formaldehyde or formaldehyde and an amine.

12 Claims, No Drawings

COMPOSITION CONTAINING A MANNICH BASE OF A PARTIALLY SULFURIZED HINDERED PHENOL MIXTURE

BACKGROUND OF THE INVENTION

This invention relates generally to sulfurized phenols which are useful as antioxidants and more specifically to liquid, partially sulfurized, hindered phenol compositions having reduced volatility and chlorine content.

Liquid, partially sulfurized, hindered phenol compositions having reduced copper corrosion are disclosed in a copending application filed concurrently herewith. These compositions contain at least about 30 weight percent of unreacted phenols. These unreacted phenols are more volatile than the sulfur bridged phenol portion of the mixture and tend to be vaporized when the mixture is used in lubricating oils during high temperature operation. We have now found that reacting the mixture with formaldehyde not only reduces the volatility of the unsulfurized phenols but, surprisingly, results in a product mixture which also has a reduced chlorine content.

SUMMARY OF THE INVENTION

In accordance with this invention, there is provided a liquid, partially sulfurized, hindered phenol product prepared by the process comprising:
(A) reacting a liquid mixture of phenols, at least about 50 weight percent of said mixture consisting of one or more reactive, hindered phenols, with a sulfurizing agent in relative proportions of phenol to sulfurizing agent to form a sulfurized intermediate in which at least about 30 weight percent of reactive, hindered phenol remains unreacted, and
(B) reacting said intermediate with formaldehyde.

Also provided are lubricants and fuel compositions containing antioxidant effective amounts of the above liquid, partially sulfurized, hindered phenol product.

DETAILED DESCRIPTION

An advantage of this invention is the liquid nature of the alkyl phenol product which facilitates its handling and dissolving in fuels, lubricating oils and other oxygen sensitive materials. The initial phenol mixture to be sulfurized should contain at least two different phenols at least one of which is a hindered phenol having at least one hydrogen in the ortho or para position to the hydroxyl group in proportions to provide a liquid product at ambient temperatures (20° C.-25° C.) from which solid material will not separate on standing. By hindered phenol is meant that the phenol is substituted in at least one ortho position with a branched chain $C_3$ to $C_{12}$ alkyl group and preferably a $C_4$ to $C_6$ alkyl group. Examples of suitable ortho-alkylphenols include:
2-tert-butylphenol
2,6-di-tert-butylphenol
2,4-di-tert-butylphenol
2-isopropylphenol
2,6-diisopropylphenol
2,4-diisopropylphenol
2-sec-butylphenol
2,6-di-sec-butylphenol
2,4-sec-butylphenol
2-tert-hexylphenol
2,6-di-tert-hexylphenol
2-tert-butyl-p-cresol
2-tert-butyl-o-cresol
2-tert-dodecylphenol
2-tert-dodecyl-p-cresol
2-tert-decyl-o-cresol
2-tert-butyl-6-isopropylphenol Suitable mixtures contain at least about 50 weight percent, preferably from about 70 to 90 weight percent, of one or more reactive hindered phenols with the remainder, if any, being one or more other phenols. By a reactive phenol is meant a phenol having at least one hydrogen in the ortho or para position to the hydroxyl group. The mixture more preferably contains at least about 50 weight percent, and most preferably from about 70 to 85 weight percent, of a di-ortho, branched chain alkyl phenol such as 2,6-di-tert-butyl phenol.

The phenolic mixture is reacted with a sulfurizing agent such as a sulfur chloride, e.g. sulfur mono- or dichloride, in an amount of sulfur chloride to provide from about 0.3 to 0.7 gram atom of sulfur per mole of reactive phenol in the mixture. For sulfur monochloride, this is equivalent to only about 0.15 to 0.35 moles of sulfur monochloride per mole of phenol which is significantly less than a stoichiometric amount such that at least about 30 weight percent, and usually from about 40 to 75 weight percent of the reactive phenols in the partially sulfurized intermediate product mixture remain unreacted.

The sulfurization reaction is exothermic and the reaction temperature is preferably kept at from about 15° C. to 70° C. (most preferably from about 35° C. to 55° C.) by cooling and/or by controlling the rate of sulfur chloride addition to the phenolic mixture. The addition usually takes from about 1 to 3 hours. Heat may be added to finish the reaction and keep the temperature within the preferred range. Higher or lower temperatures can be used so long as the reaction is completed without decomposing the product or producing a significant amount of side products. The product can be recovered either by vacuum stripping or purging the reaction mixture with an inert gas and then, optionally, filtering the mixture.

The liquid antioxidant intermediate product includes, depending upon the phenols in the initial mixture, mixtures of sulfur bridged bis and/or polyphenol compounds having from 1 to 6 or more sulfur atoms per bridge and the sulfur content of the intermediate preferably ranges from about 5 to 8 wt percent.

The partially sulfurized intermediate product is then reacted with an aldehyde, preferably formaldehyde (said term including paraformaldehyde, trioxane or other reversible polymers of formaldehyde), usually in combination with an acidic or basic material and preferably an inorganic base (NaOH, KOH and the like). Formaldehyde can also be reacted in combination with an amine to form a Mannich product with the phenol. Suitable amines include alkyl amines, diamines, polyamines or cyclic amines, for example, 1,3-diamino-propane, 1,2-diaminopropane, dimethylamine, diethylamine, dipropylamine, dibutylamine, N,N-dimethyl-1,3-diaminopropane, 1,1-dimethyldodecylamine, mixed $C_{12}$–$C_{14}$ t-alkyl amines, 2-methyl-1,5-pentanediamine, ethylene diamine, piperazine, aminoethyl piperazine, morpholine, thiomorpholine, diethylene triamine and triethylene tetraamine. Formaldehyde also can be reacted in combination with an alkali metal sulfide ($Na_2S$), an alkali metal hydrosulfide (NaSH) or $NaOH/H_2S$ which produces sodium sulfide. The amount of each reagent is not critical and generally the amount of inorganic base ranges from about 0.03–2.5 equivalents per equivalent of formaldehyde, the portions of amine range from about 0.25 to 2 moles per mole of unreacted phenol in the intermediate product, the proportions of formaldehyde range from about 0.4 to 2.0 moles per mole of unreacted phenol in the intermediate product and the proportions of sulfide, hydrosulfide or NaOH/$H_2S$ product range from about 0.2 to 1.0 mole per mole of formaldehyde. Reaction temperatures usually range from about 15° C. to 100° C. and the reaction is preferably carried out in a lower alcohol solvent such as methanol, ethanol, isopropanol and the like. The final products preferably contain from about 5 to 10 wt percent sulfur and have a reduced chlorine content of about 0.5 wt percent or less, and usually from about 0.1 to 0.4 wt percent.

The products are added to lubricating compositions or liquid organic fuels in antioxidant effective amounts which generally range from about 0.05 to 5.0 wt percent, and preferably 0.1 to 2.0 wt percent, based on the total weight of composition.

The products can be added to the oil or fuel in the form of additive concentrates usually containing a diluent oil or solvent and other additives. The amount of product in the concentrates will generally vary from about 0.5 to 50 weight percent or more.

Lubricating composition base stock oils include natural and synthetic oils having viscosities which generally range from about 2.5 to 12 cps at 100° C. depending upon the particular lubricant application. The compounds of the invention are especially useful in crankcase lubricants where they act as antioxidants and reduce sludge formation.

Advantageous results also are achieved by employing the antioxidant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

The additives of the present invention may be suitably incorporated into synthetic base oils such as alkyl esters of dicarboxylic acids, polyglycols and alcohols, polyalphaolefins, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinic-naphthenic, and the like; as well as to their formation, e.g., distillation range, straight run or cracked, hydrorefined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, molecular sieves, etc.

The compositions of the invention can also be employed in gasoline, gasohol and in middle distillate fuels such as diesel fuel, furnace oil and jet fuel.

The invention is further illustrated by, but is not intended to be limited to, the following examples wherein parts and percentages are by weight unless otherwise indicated.

EXAMPLE 1 Preparation of Intermediate

A 4-neck reactor was equipped with a mechanical stirrer, condenser, thermometer and addition funnel. The off-gas outlet of the condenser was connected to a HCl scrubber containing an aqueous NaOH solution. A charge of 1,169.0 grams of a phenolic mixture containing about 75 wt % 2,6-di-tert-butyl phenol, 2 wt % 2,4-di-tert-butyl phenol, 10 wt % ortho-tert-butyl phenol and 13 wt % 2,4,6-tri-tert-butyl phenol (5.15 moles of reactive phenols) was placed in the reactor and agitation started. Sulfur monochloride, $S_2Cl_2$, 174 grams (1.29 moles, 2.58 gram atoms of sulfur), so as to provide about 0.5 gram atoms of sulfur per mole of reactive phenols, was added dropwise over a period of about 2.5 hours. The temperature rose due to the exotherm to 46° C. After the $S_2Cl_2$ addition was completed, the reaction mixture was maintained at about 55° C. with heating for 1.0 hour. The batch was purged with $N_2$ for 30 minutes followed by vacuum stripping at 55° C. with the batch held under full vacuum (30–50 mm Hg) for about 30 minutes. The vacuum was broken and 1,246.4 grams of product was collected. The clear amber liquid product contained 6.7 wt percent sulfur and 0.6 wt percent chlorine and at the level of sulfurizing agent used, about one half of the 2,6-di-tert-butyl phenol should remain unreacted.

EXAMPLE 2

In a 500 mL reactor were placed 100 grams of the intermediate product prepared in Example 1, 4.7 grams of paraformaldehyde, 3.1 grams of KOH pellets, and 80 grams of isopropyl alcohol. The mixture was heated at 80° C. for 30 minutes and an additional 20 grams of isopropyl alcohol were added. The batch was held at 80° C. for an additional 1.5 hours after which acetic acid (3.5 grams) was added to the batch to neutralize the KOH. The solvent was then vacuum distilled until the temperature reached about 70° C. Water (~100 grams) was added, followed by 25 grams of heptane. The mixture was heated to 80° C. and then allowed to settle. The bottom aqueous layer (neutral by pH paper) was removed and the top organic layer was washed once with saturated NaCl solution and vacuum-stripped at 90° C. for 1 hour. The resulting batch was filtered through a filter-aid coated paper to give a viscous brown liquid (94 grams) which had a sulfur content of 6.31 wt percent. The chlorine content was only 0.1 wt percent compared to 0.6 wt percent in the intermediate product. The D-130 copper corrosion test result on the product at a 1.0 wt % concentration in a fully formulated 5W-30 crankcase lubricant at 121° C. for 3 hours was 1 a/b. The copper corrosion test indicates the resistance of the lubricant to corrosion of copper. A freshly refinished copper strip is placed in a 1×6 in. (25.4×152.4 mm.) test tube with 25 grams of the oil being tested. The tube is placed in a heated bath for the proper period of time. After removal from the bath, the condition of the strip is compared with a set of standard strips and given a rating according to the standard strip most closely matched. The ratings range from 1 to 4 with letters a to d for intermediate ranges.

EXAMPLE 3

To a 250 mL reactor were added 80.0 grams of the intermediate product prepared in Example 1, 3.7 grams of paraformaldehyde, 6.5 grams $Na_2S$ flakes, and 60 grams of methanol and the mixture was heated to 50°–55° C. for 2 hours. Another 3.7 grams of paraformaldehyde and 6.4 grams of $Na_2S$ (60%) flakes were added to the batch as it was cooling to room temperature overnight. The batch was reheated to 50°–55° C. for 1.5 hours and then acidified with ~18 grams of acetic acid. The solvent was then removed by vacuum distillation. To the residual material were added heptane (~70 grams) and water (~40 grams). The batch was heated to 70° C. and then allowed to settle. The bottom aqueous layer was removed and the top organic layer was washed once with warm water and the solvent was stripped in vacuum at 90° C. for 30 minutes. To the resulting material (~86.8 grams) was added ~0.9 grams filter-aid and the material was vacuum-stripped for an additional 1 hour at 90° C. The batch (86.2 grams) was then filtered to give a clear, amber, viscous liquid (81 grams collected) which contained 8.83 wt percent sulfur and 0.12 wt percent chlorine. The D-130 copper corrosion test result at a 1.0 wt % concentration in a fully formulated 5W-30 crankcase lubricant at 121° C. for 3 hours was 1b with a trace deposit.

EXAMPLE 4

To a 500 mL reactor were added 12.9 grams of $Na_2S$ flakes, 18.1 grams of water, 20.1 grams of formaldehyde solution (37 wt percent in water), and 31 grams of isopropyl alcohol and the mixture was allowed to stir until a solution was obtained. The batch was heated slowly to 50°–55° C. Beginning at 35° C., 80.0 grams of the intermediate product prepared in Example 1 were added over a period of 10 minutes and the batch temperature reached 58° C. The resulting batch was held at 50° C. for 2 hours. Glacial acetic acid (~9.5 grams) was added to acidify the basic batch. The solvent was removed in vacuum until the temperature reached 70° C. Heptane (~25 grams) was added to the batch followed by 40 grams of water. The mixture was heated to 70° C. and then allowed to settle. The bottom aqueous layer was removed and the top organic layer was washed once with water and the solvent was stripped in vacuum from 70°–90° C. The resulting stripped batch was filtered through a filter-aid coated Whatman #54 paper. A clear yellow liquid (78 grams) was obtained which contained 8.3 wt percent sulfur and 0.36 wt percent chlorine. The D-130 copper corrosion test result at a 1.0 wt percent level in a fully formulated 5W-30 crankcase lubricant at 121° C. for 3 hours was 1b.

As demonstrated by the results in Examples 2–4, the products of the invention provide good copper corrosion properties and have significantly reduced chlorine content compared to the intermediate product and, therefore, would be expected to be less corrosive, as well as being preferred from an environmental standpoint. The products are feasible for use in applications where lubricating oils with low chlorine levels are desired while providing good antioxidant properties.

What is claimed:

1. A liquid, partially sulfurized, hindered phenol product prepared by the process comprising:
   (A) reacting a liquid mixture consisting essentially of hindered phenols, at least about 50 weight percent of said mixture consisting of one or more reactive, hindered phenols, with sulfur monochloride in an amount to provide from about 0.3 to 0.7 gram atoms of sulfur per mole of reactive phenol in the mixture to form a sulfurized intermediate in which at least about 30 weight percent of reactive, hindered phenol remains unreacted, and
   (B) reacting said intermediate with formaldehyde and an amine.

2. The product according to claim 1 wherein the sulfurizing agent is sulfur monochloride and the liquid mixture of phenols comprises from about 50 to 90 weight percent of one or more reactive, di-ortho, branched chain alkyl phenols.

3. The product according to claim 2 wherein the liquid mixture of phenols comprises from about 50 to 85 weight percent of one or more reactive di-ortho, branched chain alkyl phenols.

4. The product according to claim 3 wherein said mixture comprises from about 70 to 85 weight percent of 2,6-di-tert-butyl phenol.

5. The product according to claim 1 wherein said formaldehyde is present in an amount of from about 0.4 to 2.0 moles per mole of unreacted phenol in the sulfurized intermediate.

6. The product according to claim 1 wherein said product contains less than about 0.5 weight percent chlorine.

7. A process for preparing a liquid, partially sulfurized, hindered phenol product comprising:
   (A) reacting a liquid mixture consisting essentially of hindered phenols, at least about 50 weight percent of said mixture consisting of one or more reactive, hindered phenols, with sulfur monochloride in an amount to provide from about 0.3 to 0.7 gram atoms of sulfur per mole of reactive phenol in the mixture to form a sulfurized intermediate in which at least about 30 weight percent of reactive, hindered phenol remains unreacted, and
   (B) reacting said intermediate with formaldehyde and an amine.

8. The process according to claim 7 wherein the sulfurizing agent is sulfur monochloride and the liquid mixture of phenols comprises from about 50 to 90 weight percent of one or more reactive, di-ortho, branched chain alkyl phenols.

9. The process according to claim 8 wherein the liquid mixture of phenols comprises from about 50 to 85 weight percent of one or more reactive di-ortho, branched chain alkyl phenols.

10. The process according to claim 9 wherein said mixture comprises from about 70 to 85 weight percent of 2,6-di-tert-butyl phenol.

11. The process according to claim 7 wherein said formaldehyde is present in an amount of from about 0.4 to 2.0 moles per mole of unreacted phenol in the sulfurized intermediate.

12. The process according to claim 7 wherein said product contains less than about 0.5 weight percent chlorine.

* * * * *